United States Patent

Komoda

[11] Patent Number: 5,179,723
[45] Date of Patent: Jan. 12, 1993

[54] MOBILE TELEPHONE DEVICE FOR CARRYING OUT AN AGING OPERATION WITHOUT INTERFERENCE WITH A MOBILE TELEPHONE SYSTEM

[75] Inventor: Motoyoshi Komoda, Tokyo, Japan
[73] Assignee: NEC Corporation, Tokyo, Japan
[21] Appl. No.: 534,083
[22] Filed: Jun. 6, 1990
[30] Foreign Application Priority Data
  Jun. 6, 1989 [JP] Japan .................................. 1-143234
[51] Int. Cl.$^5$ ............................................ H04B 17/00
[52] U.S. Cl. .................................. 455/67.4; 455/115; 371/20.4
[58] Field of Search .................. 455/67, 115, 226, 343, 455/67.1, 67.4, 226.1, 226.3; 379/58; 370/15, 17; 375/10; 371/20.1, 20.4, 20.5, 28

[56] References Cited

U.S. PATENT DOCUMENTS

| | | | |
|---|---|---|---|
| 3,956,601 | 5/1976 | Harris et al. | 371/20.6 |
| 4,048,564 | 9/1977 | Gleeson, Jr. | 455/115 |
| 4,455,678 | 6/1984 | McKiel, Jr. | 455/115 |
| 4,555,806 | 11/1985 | Lange et al. | 455/67 |
| 4,996,695 | 2/1991 | Pack et al. | 455/67 |

Primary Examiner—Reinhard J. Eisenzopf
Assistant Examiner—Edward Urban
Attorney, Agent, or Firm—Sughrue, Mion, Zinn, Macpeak & Seas

[57] ABSTRACT

In a mobile telephone device (10) comprising a serial interface (13b) and subjectable to an aging operation with an aging device (20) connected to the serial interface, a central processing unit (12) delivers a clock signal to an aging jig (25) through an interface unit (13) and the serial interface. In synchronism with the clock signal, the aging jig supplies particular data to the central processing unit through the interface unit and the serial interface. The central processing unit receives serial data supplied to the serial interface as received data in synchronism with the clock signal. The serial data is supplied to the serial interface both during progress of the aging operation and while the mobile telephone device is not subjected to the aging operation. The central processing unit judges whether or not the received data coincides with the particular data. When the received data coincides with the particular data, the central processing unit carries out the aging operation.

8 Claims, 4 Drawing Sheets

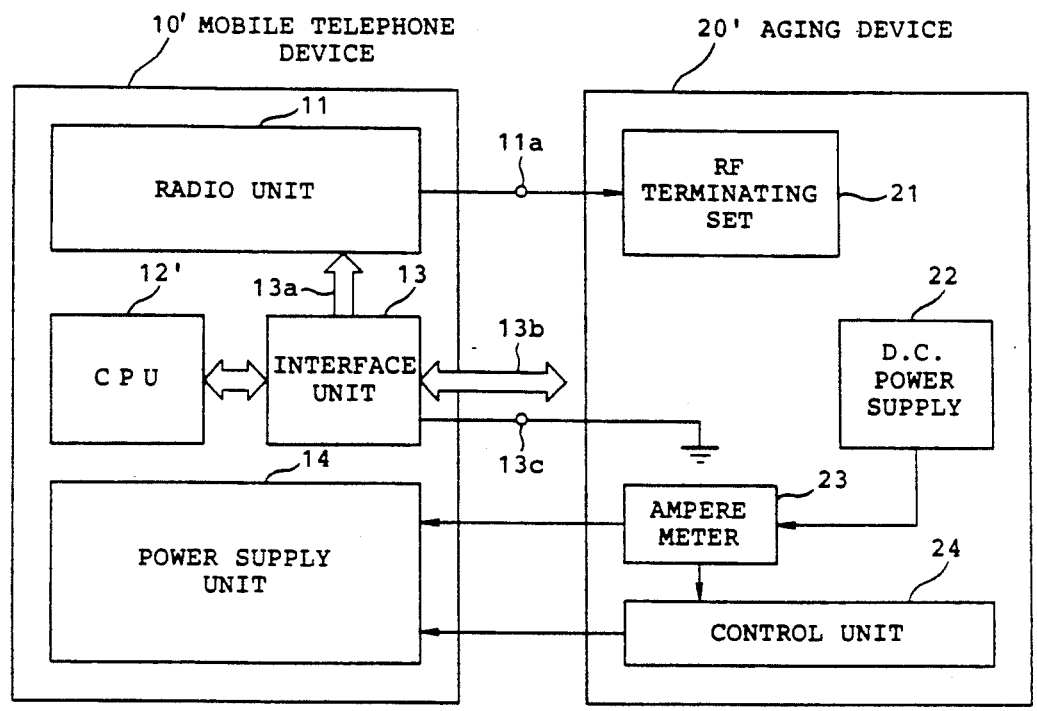
FIG. 1 PRIOR ART
FIG. 5a
ELECTRIC POWER
FIG. 5b
CLOCK SIGNAL
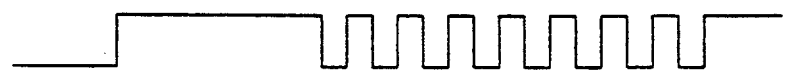
FIG. 5c
PARTICULAR DATA

MOBILE TELEPHONE DEVICE FOR CARRYING OUT AN AGING OPERATION WITHOUT INTERFERENCE WITH A MOBILE TELEPHONE SYSTEM

BACKGROUND OF THE INVENTION

This invention relates to a mobile telephone device, such as an automobile telephone device, having an aging operation function.

A mobile telephone device of the type described comprises a serial interface for connecting the mobile telephone device to an external device such as a handset. The serial interface comprises a clock terminal for supplying a clock signal to the external device and a serial data terminal for receiving serial data from the external device. The mobile telephone device comprises an antenna plug. In a normal state for a normal operation, the antenna plug is connected to an antenna.

In order to detect early or initial failure of the mobile telephone device before shipment of the mobile telephone device, the mobile telephone device has an aging operation function. When the mobile telephone device carries out an aging operation, the mobile telephone device is put into an aging state. In the aging state, the mobile telephone device is continuously or intermittently put into a transmission state.

According to prior art, a mobile telephone device comprises a particular terminal which is called an aging terminal. The aging terminal is exclusively used when the mobile telephone device is subjected to the aging operation. More specifically, the aging terminal is supplied with a logic low level when the aging terminal is grounded. Otherwise, the aging terminal is supplied with a logic high level. If the aging terminal is grounded, the mobile telephone device carries out the aging operation after power is applied to the mobile telephone device. In other words, the mobile telephone device judges whether the mobile telephone device is subjected to the normal operation or the aging operation in accordance with a logic level supplied to the aging terminal when the power is applied. When the mobile telephone device is subjected to the aging operation, the antenna plug is connected to a terminating set for restraining radiation of undesirable radio wave.

Attention will be directed to the normal state where the antenna connected to the antenna plug. It will be assumed that a user erroneously grounds the aging terminal. In this event, the conventional mobile telephone device carries out the aging operation when the power is applied to the conventional mobile telephone device. Accordingly, the conventional mobile telephone device radiates the undesirable radio wave which interferes with a mobile telephone system. In addition, it is necessary to provide the conventional mobile telephone device with the particular terminal on subjecting the conventional mobile telephone device to the aging operation. Therefore, the conventional mobile telephone device is disadvantageous in that it has a large-size and is expensive.

SUMMARY OF THE INVENTION

It is an object of the present invention to provide a mobile telephone device which can carry out an aging operation without interference with a mobile telephone system.

It is another object of the present invention to provide a mobile telephone device of the type described, which does not use a particular terminal for an aging operation.

It is still another object of the present invention to provide a mobile telephone device of the type described, which is compact and is inexpensive.

Other objects of this invention will become clear as the description proceeds.

It is possible to understand that a mobile telephone device comprises a serial interface and subjectable to an aging operation with an aging device connected to the serial interface. The aging device is for generating particular data. According to this invention, the above-mentioned mobile telephone device comprises clock delivering means connected to the serial interface for delivering a clock signal to the aging device through the serial interface, the clock delivering means thereby triggering the aging device to make the aging device supply the particular data to the serial interface; data receiving means connected to the serial interface and to the clock delivering means for receiving serial data as received data in synchronism with the clock signal, the serial data being supplied to the serial interface both during progress of the aging operation and while the mobile telephone device is not subjected to the aging operation; judging means connected to the data receiving means for judging whether or not the received data coincides with the particular data and aging means connected to the judging means for carrying out the aging operation when the received data coincides with the particular data.

BRIEF DESCRIPTION OF THE DRAWING

FIG. 1 shows in blocks a conventional mobile telephone device together with a Conventional aging device;

FIG. 5a–5c, depicted below FIG. 1, are time charts for use in describing operation of an aging jig used in the aging device illustrated in FIG. 2.

DESCRIPTION OF THE PREFERRED EMBODIMENT

Figure 2:
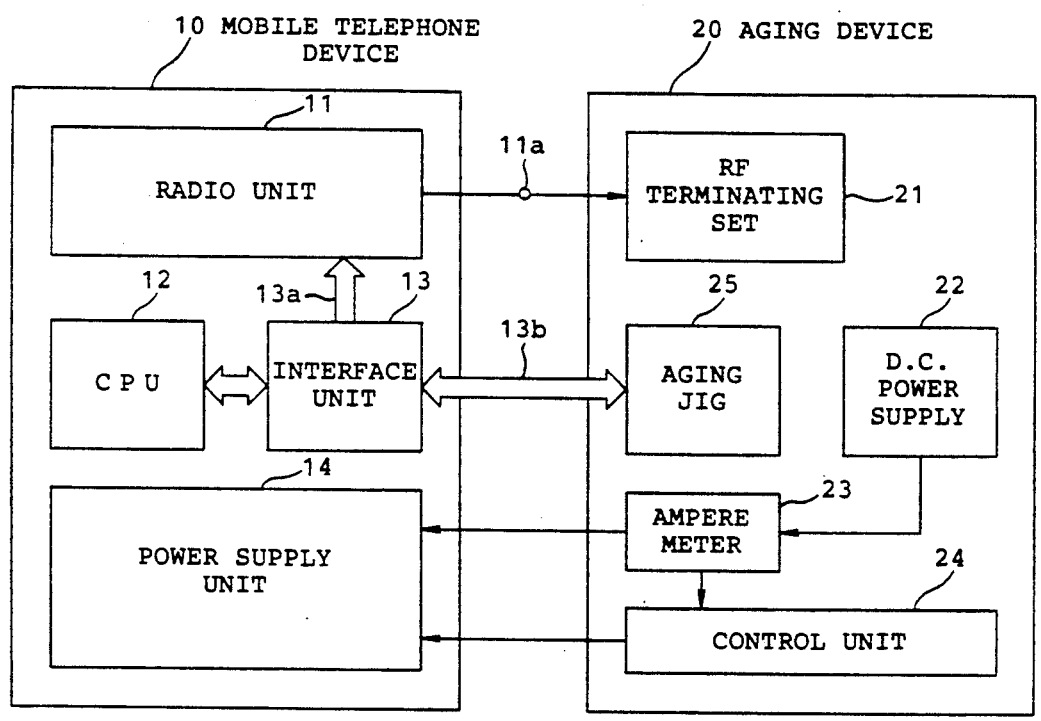
FIG. 2 shows in blocks a mobile telephone device according to an embodiment of this invention together with an aging device.

Referring to FIG. 1, description will be made at first in order to facilitate an understanding of this invention as regards a conventional mobile telephone device 10' for use in combination with a conventional aging device 20'.

As shown in FIG. 1, the conventional mobile telephone device 10' comprises a radio unit 11, a central processing unit (CPU) 12', an interface unit 13', and a power supply unit 14. The radio unit 11 has an antenna plug 11a. In a normal state for a normal operation, the antenna plug 11a is connected to an antenna (not shown). The interface unit 13' connects the central processing unit 12' with the radio unit 11 and an external device (not shown) through an internal bus 13a and a serial interface 13b, respectively. The external device may be a handset. The power supply unit 14 supplies electric power to the radio unit 11, the central processing unit 12', and the interface unit 13'. The power supply unit 14 is controlled by the conventional aging device 20' in the manner which will later become clear.

The interface unit 13' has an aging terminal 13c. It will later be described that the aging terminal 13c is for making the conventional mobile telephone device 10' carry out an aging operation.

The conventional aging device 20' comprises an RF terminating set 21, a D.C. power supply 22, an ampere meter 23, and a control unit 24.

Attention will be directed to an aging state for an aging operation. Under the circumstances, the RF terminating set 21 is connected to the antenna plug 11a. The aging terminal 13c is grounded. The D.C. power supply 22 is connected to the power supply unit 14 through the ampere meter 23. The ampere meter 23 measures a current which flows from the D.C. power supply 22 to the power supply unit 14 to produce current data indicative of the current. The control unit 24 carries out on-off control of the power supply unit 14 and reads the current data from the ampere meter 23.

Description will be made below as regards the aging operation of the conventional mobile telephone device 10' more in detail.

The control unit 24 turns the power supply unit 14 on. Thereupon, the power supply unit 14 supplies the electric power to the radio unit 11, the central processing unit 12', and the interface unit 13'. The central processing unit 12' initializes the interface unit 13'. The central processing unit 12' judges whether or not the aging terminal 13c is grounded. When the aging terminal 13c is grounded, the central processing unit 12' carries out the aging operation. More particularly, the central processing unit 12' makes the radio unit 11 select a transmission channel and transmission power through the interface unit 13. Subsequently, the central processing unit 12' makes the radio unit 11 transmit a radio wave through the transmission channel.

On the other hand, the ampere meter 23 measures the current during a predetermined time interval which is, for instance, equal to one minute. If the current is usual, the control unit 24 turns the power supply unit 14 off. After a predetermined time duration elapses, the control unit 24 again turns the power supply unit 14 on. The predetermined time duration is, for example, equal to five minutes. The aging operation is repeatedly carried out during a predetermined time period which is, for instance, equal to twelve hours.

Attention will be directed to the normal state where the antenna is connected to the antenna plug 11a. It will be assumed that a user erroneously grounds the aging terminal 13b. In this event, the central processing unit 12' carries out the aging operation when the power supply unit 14 supplies the electric power. Therefore, the conventional mobile telephone device 10' has disadvantages, as pointed out in the preamble of the instant specification.

Referring to FIG. 2, a mobile telephone device 10 according to an embodiment of this invention is for use in combination with an aging device 20, like in FIG. 1.

In FIG. 2, the mobile telephone device 10 is similar in structure and operation to the conventional mobile telephone device 10' illustrated in FIG. 1 except that the aging terminal 13c is omitted. The aging device 20 is similar in structure and operation to the conventional aging device 20' illustrated in FIG. 1 except that the aging device 20 further comprises an aging jig 25. On carrying out the aging operation, the aging device 20 is connected to the mobile telephone device 10. More specifically, the RF terminating set 21 is connected to the antenna plug 11a. The aging jig 25 is connected to the serial interface 13b. The D.C. power supply 22 is connected to the power supply unit 14 through the ampere meter 23. The control unit 24 is directly connected to the power supply unit 14. The aging jig 25 is for supplying the mobile telephone device 10 with particular data which will later be described. When supplied with the particular data, the mobile telephone device 10 carries out the aging operation in the manner which will be described below.

Figure 3:
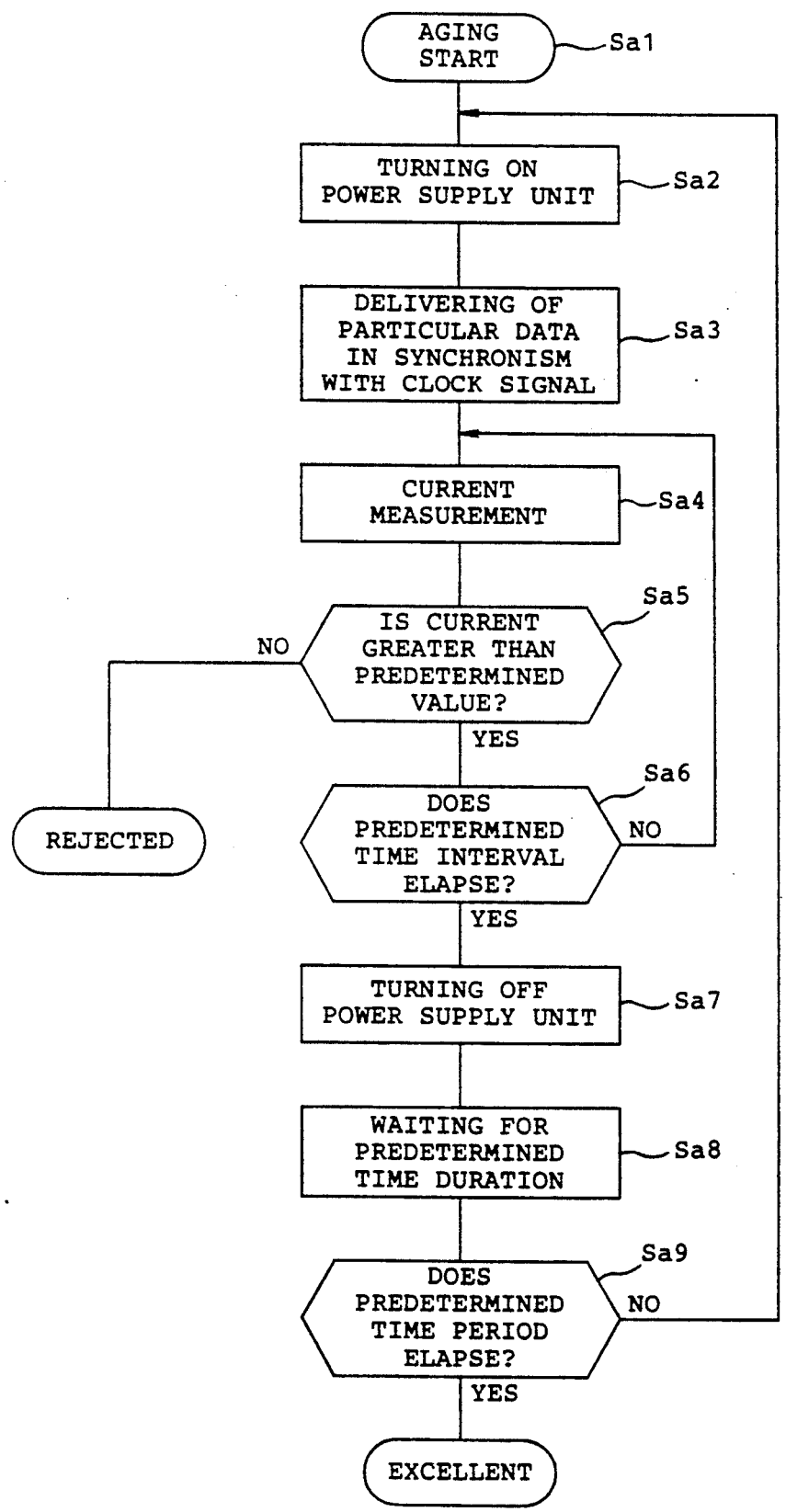
FIG. 3 is a flow chart for use in describing operation of the aging device illustrated in FIG. 2.
Figure 4:
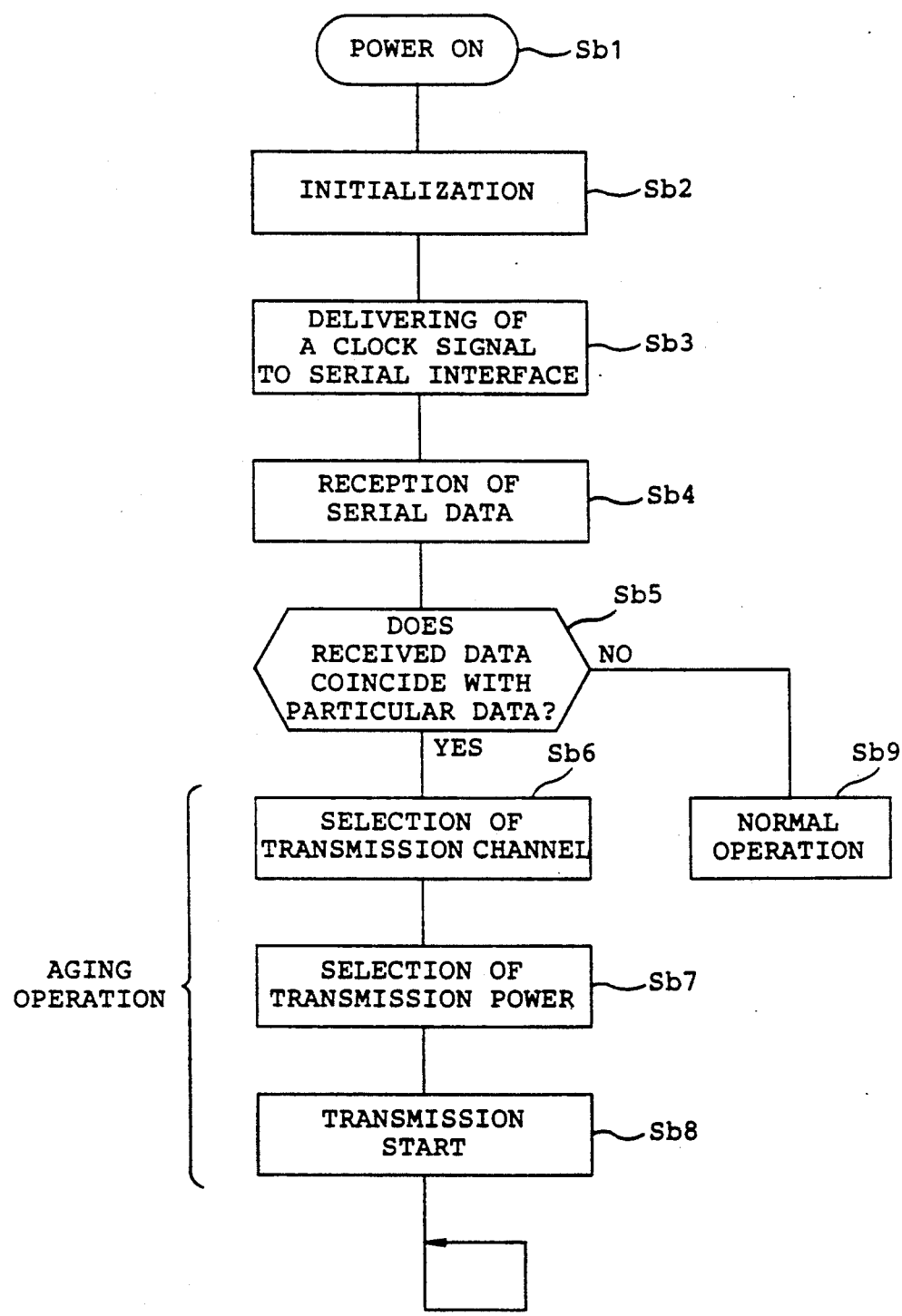
FIG. 4 is a flow chart for use in describing operation of a central processing unit used in the mobile telephone device illustrated in FIG. 2.

Referring to FIGS. 3 and 4, description will be made as regards the aging operation which the mobile telephone device 10 carries out in cooperation with the aging device 20.

When the aging operation starts (a first stage Sa1 of FIG. 3), the control unit 24 turns the power supply unit 14 of the mobile telephone device 10 on (a second stage Sa2 of FIG. 3). Thereupon, the power supply unit 14 supplies the electric power to the radio unit 11, the central processing unit 12, and the interface unit 13.

When the electric power turns on (a first step Sb1 of FIG. 4), the central processing unit 12 initializes the interface unit 13 (a second step Sb2 of FIG. 4). The central processing unit 12 delivers a clock signal to the aging jig 25 through the interface unit 13 and the serial interface 13b (a third step Sb3 of FIG. 4). The central processing unit 12 therefore acts in cooperation with the interface unit 13 as a clock delivering arrangement at the third step Sb3 of FIG. 4. The aging jig 25 delivers the particular data to the serial interface 13b in synchronism with the clock signal (a third stage Sa3 of FIG. 3). The clock delivering arrangement thereby triggers the aging device 20 to make the aging device 20 supply the particular data to the serial interface 13b.

The central processing unit 12 receives serial data as received data in synchronism with the clock signal (a fourth step Sb4 of FIG. 4). The serial data is supplied to the serial interface 13b both during progress of the aging operation and while the mobile telephone device 10 is not subjected to the aging operation. The central processing unit 12 therefore serves in combination with the interface unit 13 as a data receiving arrangement at the fourth step Sb4 of FIG. 4.

The central processing unit 12 judges whether or not the received data Coincides with the particular data (a fifth step Sb5 of FIG. 4). The central processing unit 12 is therefore operable as a judging arrangement at the fifth step Sb5 of FIG. 4.

When the received data coincides with the particular data, the central processing unit 12 carries out the aging operation. More particularly, the central processing unit 12 makes the radio unit 11 select a transmission channel and transmission power through the interface unit 13 (sixth and seventh steps Sb6 and Sb7 of FIG. 4). Subsequently, the central processing unit 12 makes the radio unit 11 transmit a radio wave through the transmission channel (an eighth step Sb8 of FIG. 4). It is now understood that the central processing unit 12 acts as an aging arrangement at the sixth through the eighth step Sb6 to Sb8 of FIG. 4. When the received data does not coincide with the particular data, the central processing unit 12 carries out a normal operation (a ninth step Sb9 of FIG. 4).

When the mobile telephone device 10 is put into the aging state, the mobile telephone device 10 consumes a current supplied from the D.C. power supply 22. The ampere meter 23 measures the current (a fourth stage Sa4 of FIG. 3). If the current is greater than a predetermined value (YES of a fifth stage Sa5 of FIG. 3), the current is measured by the ampere meter 23 until the predetermined time interval elapses (NO of a sixth stage Sa6 of FIG. 3). If the current is not greater than the predetermined value or is abnormal (NO of the fifth stage Sa5 of FIG. 3), the mobile telephone device 10 is determined to be defective and thus is rejected. When the predetermined time interval elapses, the control unit 24 turns the power supply unit 14 off (a seventh stage Sa7 of FIG. 3).

After the predetermined time duration elapses (an eighth stage Sa8 of FIG. 3), the control unit 24 again turns the power supply unit 14 on at the second stage Sa2 if a predetermined time period does not elapse (NO of a ninth stage Sa9 of FIG. 3). When the predetermined time period elapses, the mobile telephone device 10 is regarded excellent.

Referring to FIGS. 5a-5c description will proceed to the electric power, the clock signal, and the particular data depicted along first through third lines. After the electric power turns on, the central processing unit 12 delivers the clock signal to the aging jig 25 through the interface unit 13 and the serial interface 13b. The aging jig 25 supplies the particular data to the central processing unit 12 through the serial interface 13b and the interface unit 13 in synchronism with the clock signal. In the example being illustrated, the particular data is eight bits long and is represented by binary 0010 1110. It is possible to reduce a probability where the aging operation is erroneously carried out when the particular data consists of a lot of bits.

What is claimed is:

1. A mobile telephone device comprising a serial interface and subjectable to an aging operation with an aging device connected to said serial interface, said aging device being for generating particular data, said mobile telephone device comprising:
   clock delivering means connected to said serial interface for delivering a clock signal to said aging device through said serial interface, said clock delivering means thereby triggering said aging device to make said aging device supply particular data to said serial interface;
   data receiving means connected to said serial interface and to said clock delivering means for receiving serial data as received data in synchronism with said clock signal, said serial data being supplied to said serial interface both during progress of said aging operation and while said mobile telephone device is not subjected to said aging operation;
   judging means connected to said data receiving means for judging whether or not said received data coincides with said particular data; and
   aging means connected to said judging means for carrying out said aging operation when said received data coincides with said particular data.

2. A mobile telephone device comprising:
   means for providing a clock signal to an aging device;
   means for receiving data from said aging device to produce received data;
   means for comparing said received data with particular data and producing a detection signal if they coincide with each other; and
   aging means responsive to said detection signal for putting said mobile telephone device into an aging operation mode.

3. A mobile telephone device as claimed in claim 2, further comprising a serial interface, wherein said providing means comprises means for providing said clock signal to said aging device through said serial interface.

4. A mobile telephone device as claimed in claim 2, further comprising a radio unit, wherein said aging means comprises means for turning on and off said radio unit at a predetermined interval.

5. A method of carrying out an aging test for a mobile telephone device having a radio unit, comprising the following steps of:
   providing a clock signal from said mobile telephone device to an aging device;
   responsive to said clock signal, providing aging data from said aging device to said mobile telephone device;
   comparing said aging data with particular data and producing a control signal if they are equal to each other; and
   responsive to said control signal, conducting the aging test of said mobile telephone device.

6. A method as claimed in claim 5, wherein said clock providing step comprises the step of providing said clock signal from said mobile telephone device to said aging device through a serial interface, and wherein said data providing step comprises the step of providing said aging data from said aging device to said mobile telephone device through said serial interface.

7. A method as claimed in claim 5, wherein said conducting step comprises the step of turning on and off said radio unit for a predetermined period of time.

8. A method as claimed in claim 7, wherein said conducting step further comprises the steps of:
   measuring a current which is consumed at said radio unit to produce a measured current; and
   determining whether or not said measured current is not greater than a predetermined value and producing a failure signal if said measured current is not greater than said value.

* * * * *

UNITED STATES PATENT AND TRADEMARK OFFICE
CERTIFICATE OF CORRECTION

PATENT NO. : 5,179,723
DATED : Jan. 12, 1993
INVENTOR(S) : Motoyoshi KOMODA et al.

It is certified that error appears in the above-identified patent and that said Letters Patent is hereby corrected as shown below:

Col. 4, line 46, delete "Coincides" and insert --coincides--.

Signed and Sealed this

Twenty-fifth Day of January, 1994

Attest:

BRUCE LEHMAN

Attesting Officer     Commissioner of Patents and Trademarks